United States Patent

[11] 3,615,650

| [72] | Inventor | Stanley B. Smith<br>Springville, N.Y. |
|---|---|---|
| [21] | Appl. No. | 882,306 |
| [22] | Filed | Dec. 4, 1969 |
| [45] | Patented | Oct. 26, 1971 |
| [73] | Assignee | Agway, Inc.<br>Syracuse, N.Y. |

[54] FEED RATION AND FEEDING PROCEDURE FOR THE ELIMINATION OF PESTICIDE RESIDUES IN POULTRY
1 Claim, No Drawings

[52] U.S. Cl. ................................................. 99/4, 99/11
[51] Int. Cl. ................................................. A23k 1/00
[50] Field of Search ........................................... 99/4, 11, 2

[56] References Cited
UNITED STATES PATENTS

| 2,703,303 | 3/1955 | Rickes et al. | 99/4 |
| 2,879,162 | 3/1959 | Baldini et al. | 99/4 |
| 2,924,526 | 2/1960 | Bachman et al. | 99/4 |
| 3,372,033 | 3/1968 | Leeuwen et al. | 99/4 |
| 3,433,641 | 3/1969 | Margot | 99/4 |

*Primary Examiner*—Norman Yudkoff
*Assistant Examiner*—Hiram H. Bernstein
*Attorneys*—Conrad Christel and Edwin T. Bean, Jr.

ABSTRACT: This invention concerns an improved feed ration and feeding procedure for the removal of chlorinated hydrocarbon pesticide residues, and other fat-soluble pesticide residues, from poultry meat and eggs, where the fowls have been exposed to, or have ingested, chlorinated hydrocarbon or other fat-soluble pesticide residues.

FEED RATION AND FEEDING PROCEDURE FOR THE ELIMINATION OF PESTICIDE RESIDUES IN POULTRY

BACKGROUND OF THE INVENTION

It is well known and substantiated by actual analysis, that due to the extensive use of pesticides, harmful chlorinated hydrocarbon pesticide residues are widely distributed in food and feed products. Actual analyses on 710 samples of cereal grains for poultry and livestock feeding in the year 1966–1967 revealed that 37 percent pesticide residues. More recent information shows that this pesticide residue problem is increasing materially with a larger percentage of residues present at higher levels. In certain areas, the situation is becoming critical.

These chlorinated hydrocarbon and fat-soluble pesticide residues concentrate in the body fat of poultry, particularly the fat layer just under the skin. These residues are also concentrated in the egg yolks. The chlorinated hydrocarbon and fat-soluble pesticide residues stress laying bird for vitamin A, riboflavin and unsaturated fatty acids, increasing the requirement for these factors. It is known that poultry containing a high level of these residues is rendered unfit for human consumption, and such birds must be slaughtered and disposed of, which results in a great economic loss to the poultryman.

BRIEF SUMMARY OF THE INVENTION

This invention has as an object a feed ration and a procedure of feeding it to the poultry to bring about the rapid elimination of chlorinated hydrocarbon and fat-soluble pesticide residues in poultry, by the regulated feeding of special formulated diet rations which contain a small amount of Inositol for fat mobilization, with a substantial elimination of such residues from the poultry.

DETAILED DESCRIPTION OF THE INVENTION

The feeding program procedure consists of feeding the following diet ration in crumble or pellet form for a period of two weeks:

| | |
|---|---|
| Corn | 38.00–44.00% |
| Wheat Bran | 18.00–22.00% |
| Alfalfa 20% | 1.50–2.50% |
| Gluten Feed | 3.00–4.50% |
| Meat & Bone Meal | 4.00–6.00% |
| Herring Meal | 0.25–0.75% |
| Soybean Meal 50$ | 16.00–17.50% |
| | |
| Protein (min) | 18.00% |
| Fat (min) | 3.00% |
| Fiber (max) | 4.50% |
| Calcium | 3.50–4.00% |
| Phosphorous | 0.85–0.95% |
| Metabolizable Energy | 1,030.00–1,060 calories/lb. |
| Riboflavin | 8.90–9.1 mg./lb. |
| Niacin | 40.00–45.0 mg./lb. |
| Pantothenic Acid | 9.50–10.5 mg./lb. |
| Choline | 1,020.00–1,040 mg./lb. |
| Folic Acid | 0.50–0.6 mg./lb. |
| Manganese | 50.00–55.0 mg./lb. |
| Vitamin A | 10,050.00–10,100 I.U./lb. |
| Vitamin D$_3$ | 2,150.00–2,200 I.U./lb. |
| Vitamin E | 3,100.00–3,150 I.U./lb. |
| Lysine | 0.85–0.95% |
| Methionine | 0.28–0.32% |
| Methionine-Cystine | 0.55–0.6% |
| Inositol | 0.10% |

For the next three weeks—that is, the 3rd, 4th & 5th weeks of the feeding program, the normal feeding ration for laying birds is fed. This normal feeding ration is fortified with one pound per ton of Inositol, six mg./lb. of riboflavin, and 3400 International Units/lb. of vitamin A. For the succeeding 2-week period—that is, the 6th and 7th weeks of the feeding program, the poultry is fed a diet ration as set forth above, except that the Inositol is reduced from 0.10 percent to 0.05 percent.

In one of several tests, over 20,000 chickens, having by analysis an objectionable high level of pesticide residues, were fed the above ration according to the program set forth and it was subsequently ascertained by analysis that in over 80 percent of the chickens, the objectionable residues had been eliminated. The 20 percent of this group indicating the presence of some residue were again fed the normal ration which was fed during the 3rd, 4th and 5th weeks of the program and the diet ration corresponding to that fed during the 6th and 7th weeks of the program was repeated. Analysis then showed that the pesticide residues in this 20 percent group had been eliminated.

It will be apparent that the diet ration set forth involves negligible cost over the normal feeding ration. However, the feeding procedure brings about the elimination of the objectionable residues, rendering the birds and the eggs produced thereby saleable for human consumption and accordingly, avoiding the economic loss now incurred because of the presence of such residues.

If the poultry contains an exceptionally high level of these residues, or for any other reason it is determined at the end of the 7-week feeding program, that the level has not been reduced to the proper extent, the feeding program is repeated, starting with a normal ration which was fed the 3rd, 4th and 5th week and the diet ration corresponding to that fed during the 6th and 7th week is repeated for the 11th and 12th week of the entire program. This additional feeding has been found to eliminate the objectionable residues from the poultry.

What I claim is:

1. A feeding procedure for reducing chlorinated hydrocarbon or fat-soluble pesticide residues from poultry consisting in feeding the poultry for a two-week period the following diet ration:

| | |
|---|---|
| Corn | 38.00–44.00% |
| Wheat Bran | 18.00–22.00% |
| Alfalfa 20% | 1.50–2.50% |
| Gluten Feed | 3.00–4.50% |
| Meat & Bone Meal | 4.00–6.00% |
| Herring Meal | 0.25–0.75% |
| Soybean Meal 50% | 16.00–17.50% |
| | |
| Protein (min) | 18.00% |
| Fat (min) | 3.00% |
| Fiber (max) | 4.50% |
| Calcium | 3.50–4.00% |
| Phosphorus | 0.85–0.95% |
| Metabolizable Energy | 1,030.00–1,060 calories/lb. |
| Riboflavin | 8.90–9.1 mg./lb. |
| Niacin | 40.00–45.0 mg./lb. |
| Pantothenic Acid | 9.50–10.5 mg./lb. |
| Choline | 1,020–1,040 mg./lb. |
| Folic Acid | 0.5–0.6 mg./lb. |
| Manganese | 50.0–55.0 mg./lb. |
| Vitamin A | 10,050–10,100 I.U./lb. |
| Vitamin D$_3$ | 2,150–2,200 I.U./lb. |
| Vitamin E | 3,100–3,150 I.U./lb. |
| Lysine | 0.85–0.95% |
| Methionine | 0.28–0.32% |
| Methionine-Cystine | 0.55–0.60% |
| Inositol | 0.10% | feeding the poultry for the next succeeding 3-week period a normal ration fortified with 1 pound per ton of Inositol, 6 mg./lb. of riboflavin, and 3,400 International Units/lb. of vitamin A, and feeding the poultry for the next succeeding 2-week period the diet ration set forth with the reduction of Inositol from 0.10 percent to 0.05 percent.